(12) United States Patent
Bangolae et al.

(10) Patent No.: US 9,801,228 B2
(45) Date of Patent: Oct. 24, 2017

(54) SYSTEMS, APPARATUSES, AND METHODS FOR LIGHTWEIGHT OVER-THE-AIR SIGNALING MECHANISMS IN DATA COMMUNICATIONS

(71) Applicant: Intel IP Corporation, Santa Clara, CA (US)

(72) Inventors: Sangeetha L. Bangolae, Beaverton, OR (US); Marta Martinez Tarradell, Hillsboro, OR (US); Umesh Phuyal, Hillsboro, OR (US); Youn Hyoung Heo, San Jose, CA (US)

(73) Assignee: Intel IP Corporation, Santa Clara, CA (US)

( * ) Notice: Subject to any disclaimer, the term of this patent is extended or adjusted under 35 U.S.C. 154(b) by 253 days.

(21) Appl. No.: 14/669,908

(22) Filed: Mar. 26, 2015

(65) Prior Publication Data

US 2016/0029426 A1 Jan. 28, 2016

Related U.S. Application Data

(60) Provisional application No. 62/027,765, filed on Jul. 22, 2014.

(51) Int. Cl.
*H04J 3/16* (2006.01)
*H04W 76/02* (2009.01)
(Continued)

(52) U.S. Cl.
CPC ......... *H04W 76/027* (2013.01); *H04W 72/04* (2013.01); *H04W 72/048* (2013.01);
(Continued)

(58) Field of Classification Search
USPC ......... 370/329–331, 252–256, 352, 468, 311
See application file for complete search history.

(56) References Cited

U.S. PATENT DOCUMENTS

| 8,660,078 B2 * | 2/2014 | Song ..................... H04W 76/02 370/252 |
| 2012/0163296 A1 | 6/2012 | Cheon et al. |

(Continued)

FOREIGN PATENT DOCUMENTS

WO WO-2016014179 A1 1/2016

OTHER PUBLICATIONS

"3GPP; TSGSA, Study on Machine-Type Communications (MTC) and other mobile data applications communications enhancements", 3GPP TR 23.887 V12,0.0, (Dec. 20, 2013).
(Continued)

*Primary Examiner* — Hanh N Nguyen
(74) *Attorney, Agent, or Firm* — Schwegman Lundberg & Woessner, P.A.

(57) ABSTRACT

Disclosed herein are methods, apparatuses, and systems for utilizing lightweight communication protocols between different network components. A messaging process is utilized which includes a random access procedure for a user equipment (UE) and an eNodeB, and a messaging sequence comprising a reduced number of messages (compared to a legacy Radio Resource Control (RRC) Connection messaging sequence) exchanged between different nodes of the network to establish a connection. These messages can be generated using any combination of pre-configured or pre-determined data specific to either the UE or to lightweight communication protocols.

23 Claims, 9 Drawing Sheets

(51) Int. Cl.
*H04W 72/04* (2009.01)
*H04W 4/00* (2009.01)
*H04W 4/10* (2009.01)

(52) U.S. Cl.
CPC ............ *H04W 76/02* (2013.01); *H04W 4/005* (2013.01); *H04W 4/10* (2013.01); *H04W 76/023* (2013.01)

(56) References Cited

U.S. PATENT DOCUMENTS

| | | |
|---|---|---|
| 2013/0051338 A1 | 2/2013 | Ryu et al. |
| 2014/0003348 A1 | 1/2014 | Velev et al. |
| 2014/0226576 A1* | 8/2014 | Gupta .................. H04W 56/00 370/329 |
| 2015/0223284 A1* | 8/2015 | Jain .................. H04W 52/0258 370/329 |
| 2016/0057797 A1* | 2/2016 | Bangolae .......... H04W 52/0209 370/311 |

OTHER PUBLICATIONS

"International Application Serial No. PCT/US2015/036327, International Preliminary Report on Patentability dated Feb. 2, 2017", 10 pgs.
"International Application Serial No. PCT/US2015/038327, International Search Report dated Oct. 19, 2015", 3 pgs.
"International Application Serial No. PCT/US2015/036327, Written Opinion dated Oct. 19, 2015", 8 pgs.
Huawei, et al., "Parameter Configuration for D2D Radio Bearers", R2-142695 3GPP TSG RAN WG2 Meeting. (2014).

\* cited by examiner

600  RRCConnectionRequest message

```
-- ASN1START

RRCConnectionRequest ::=        SEQUENCE {
    criticalExtensions              CHOICE {
        rrcConnectionRequest-r8         RRCConnectionRequest-r8-IEs,
        criticalExtensionsFuture        SEQUENCE {}
    }
}                                                                           ⎫ 630

RRCConnectionRequest-r8-IEs ::= SEQUENCE {
    ue-Identity                     InitialUE-Identity,
    establishmentCause              EstablishmentCause,
    spare                           BIT STRING (SIZE (1))
}                                                                           ⎫ 620

InitialUE-Identity ::=          CHOICE {
    s-TMSI                          S-TMSI,
    randomValue                     BIT STRING (SIZE (40))
}

EstablishmentCause ::=          ENUMERATED {
                                    emergency, highPriorityAccess, mt-Access, mo-Signalling,
                                    mo-Data, delayTolerantAccess-v1020, spare2, spare1}    ⎫ 610

-- ASN1STOP
```

FIG. 6A

```
-- ASN1START                                    650

UL-CCCH-Message ::= SEQUENCE {
    message                    UL-CCCH-MessageType
}

UL-CCCH-MessageType ::= CHOICE {
    c1                         CHOICE {
        rrcConnectionReestablishmentRequest    RRCConnectionReestablishmentRequest,
        rrcConnectionRequest                   RRCConnectionRequest
    },
    messageClassExtension    SEQUENCE-{} CHOICE {
        c2                     CHOICE {
            lightweightConnectionRequest-r13        LightweightConnectionRequest-r13,
            spare15 NULL, spare14 NULL, spare13 NULL,
            spare12 NULL, spare11 NULL, spare10 NULL,
            spare9 NULL, spare8 NULL, spare7 NULL,
            spare6 NULL, spare5 NULL, spare4 NULL,
            spare3 NULL, spare2 NULL, spare1 NULL
        },
        messageClassExtensionFuture-r13 SEQUENCE {}
    }
}

-- ASN1STOP

-- ASN1START

LightweightConnectionRequest-r13 ::=            SEQUENCE {
    criticalExtensions                CHOICE {
        c1                            CHOICE {
            lightweightConnectionRequest-r13     LightweightConnectionRequest-r13-IEs,
            spare3 NULL, spare2 NULL, spare1 NULL
        },
        criticalExtensionsFuture      SEQUENCE {}
    }
}

LightweightConnectionRequest-r13-IEs ::=        SEQUENCE {
    ue-Identity               InitialUE-Identity,
    establishmentCause        EstablishmentCause,
    connectionType-r13        BIT STRING (SIZE (1))              OPTIONAL,
    lateNonCriticalExtension  OCTET STRING                       OPTIONAL,
    nonCriticalExtension      SEQUENCE {}                        OPTIONAL
}

-- ASN1STOP
```

FIG. 6B

SYSTEMS, APPARATUSES, AND METHODS FOR LIGHTWEIGHT OVER-THE-AIR SIGNALING MECHANISMS IN DATA COMMUNICATIONS

PRIORITY

This application claims the benefit of U.S. Provisional Application No. 62/027,765 filed Jul. 22, 2014, the entire contents of which are hereby incorporated by reference herein.

TECHNICAL FIELD

Embodiments pertain to wireless communications. Some embodiments relate to user equipment (UE)-eNodeB signaling information.

BACKGROUND

Wireless mobile devices or user equipments (UEs) may communicate with each other using radio access technologies such as the 3GPP Long-Term Evolution ("LTE") Advanced Release 12 (March 2014) (the "LTE-A Standard"), the IEEE 802.16 standard, IEEE Std. 802.16-2009, published May 29, 2009 ("WiMAX"), as well as any other wireless protocols that are designated as 3G, 4G, 5G, and beyond.

Short-lived UE connections are a potential source of increasing network traffic. Technologies such as device-to-device (D2D), sensor networks or Internet of Things (IoT) (which describes interconnecting uniquely identifiable embedded computing devices within the internet infrastructure) can utilize short-lived connections. Background applications executed by UEs (e.g., keep-alive messages, status updates, etc.) can also utilize short-lived connections. Utilizing traditional connectivity procedures for all short-lived UE connections would significantly increase signaling overheard.

BRIEF DESCRIPTION OF THE DRAWINGS

FIG. 6A is an illustration of potential modifications to an Radio Resource Control (RRC) Connection Request (RRC-ConnectionRequest) message for indicating a lightweight connection request in accordance with some embodiments.

FIG. 6B is an illustration of a message data structure specifically for devices that intend to utilize a lightweight connection request in accordance with some embodiments.

DETAILED DESCRIPTION

The following description and the drawings sufficiently illustrate specific embodiments to enable those skilled in the art to practice them. Other embodiments can incorporate structural, logical, electrical, process, and other changes. Portions and features of some embodiments can be included in, or substituted for, those of other embodiments. Embodiments set forth in the claims encompass all available equivalents of those claims.

In some embodiments, mobile devices or other devices described herein can be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), or other device that can receive and/or transmit information wirelessly. In some embodiments, the mobile device or other device can be a user equipment (UE) or an Evolved Node-B (eNodeB) configured to operate in accordance with 3GPP standards (e.g., the 3GPP Long Term Evolution ("LTE") Advanced Release 12 (March 2014) (the "LTE-A Standard")). In some embodiments, the mobile device or other device can be configured to operate according to other protocols or standards, including IEEE 802.11 or other IEEE and 3GPP standards. In some embodiments, the mobile device or other device can include one or more of a keyboard, a display, a non-volatile memory port, multiple antennas, a graphics processor, an application processor, speakers, and other mobile device elements. The display can be a liquid crystal display (LCD) screen including a touch screen.

Figure 1:
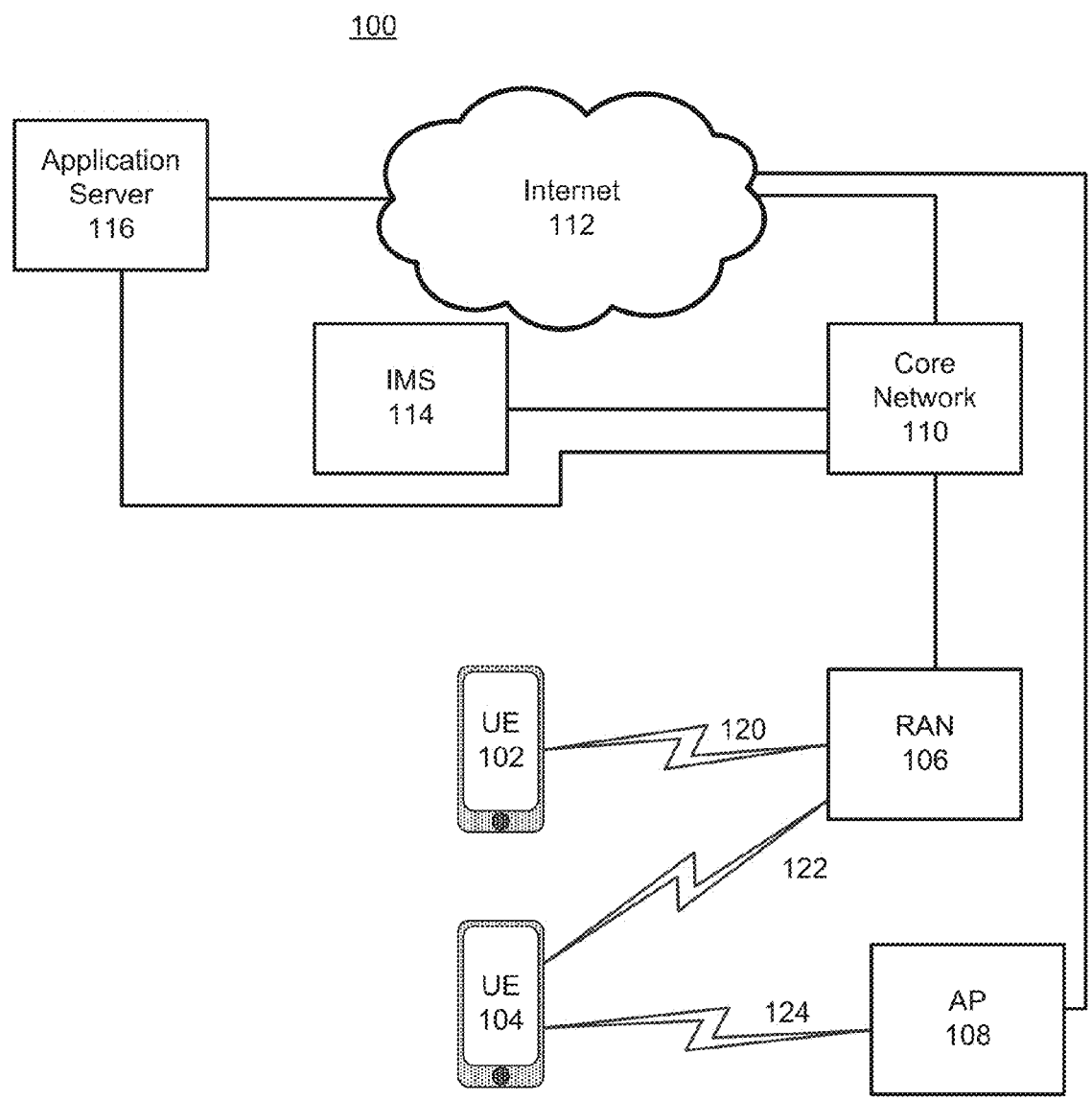
FIG. 1 illustrates an architecture of a wireless network with various components of the network, in accordance with some embodiments.

FIG. 1 illustrates an architecture of a wireless network with various components of the network, in accordance with some embodiments. A system 100 is shown to include a UE 102 and a UE 104. The UEs 102 and 104 are illustrated as smartphones (i.e., handheld touchscreen mobile computing devices connectable to one or more cellular networks), but can also include PDAs, pagers, laptop computers, desktop computers, and the like.

The UEs 102 and 104 are configured to access a radio access network (RAN) 106 via connections 120 and 122, respectively, each of which comprise a physical communications interface or layer; in this example, the connections 120 and 122 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP LTE protocol, and the like.

The RAN 106 can include one or more access points that enable the connections 120 and 122. These access points (described in further detail below) can be referred to as access nodes, base stations (BSs), NodeBs, eNodeBs, and so forth, and can comprise ground stations (i.e., terrestrial access points) or satellite access points providing coverage within a geographic area (i.e., a cell). The RAN 106 is shown to be communicatively coupled to a core network 110. The core network 110 can be used to enable a packet-switched data exchange with the internet 112 in addition to bridging circuit switched calls between the UEs 102 and 104. In some embodiments, the RAN 106 can comprise an Evolved UMTS (Universal Mobile Telecommunications System) Terrestrial Radio Access Network (E-UTRAN), and the core network 110 can comprise an Evolved Packet Core (EPC) network.

The UE 104 is shown to be configured to access an access point (AP) 108 via connection 124. The connection 124 can comprise a local wireless connection, such as a connection consistent with IEEE 802.11, wherein the AP 108 would comprise a wireless fidelity (WiFi) router. In this example, the AP 108 is shown to be connected to the Internet 112 without connecting to the core network 110.

The Internet 112 is shown to be communicatively coupled to an application server 116. The application server 116 can be implemented as a plurality of structurally separate servers or can be included in a single server. The application server 116 is shown as connected to both the Internet 112 and the core network 110; in other embodiments, the core network 110 connects to the application server 116 via the Internet 112. The application server 116 can also be configured to support one or more communication services (e.g., Voice-over-Internet Protocol (VoIP) sessions, PTT sessions, group communication sessions, social networking services, etc.) for UEs that can connect to the application server 116 via the core network 110 and/or the Internet 112.

The core network 110 is further shown to be communicatively coupled to Internet Protocol (IP) Multimedia Subsystem (IMS) 114. The IMS 114 comprises an integrated network of telecommunications carriers that can enable the use of IP for packet communications, such as traditional telephony, fax, e-mail, internet access, VoIP, instant messaging (IM), videoconference sessions and video on demand (VoD), and the like.

Figure 2:
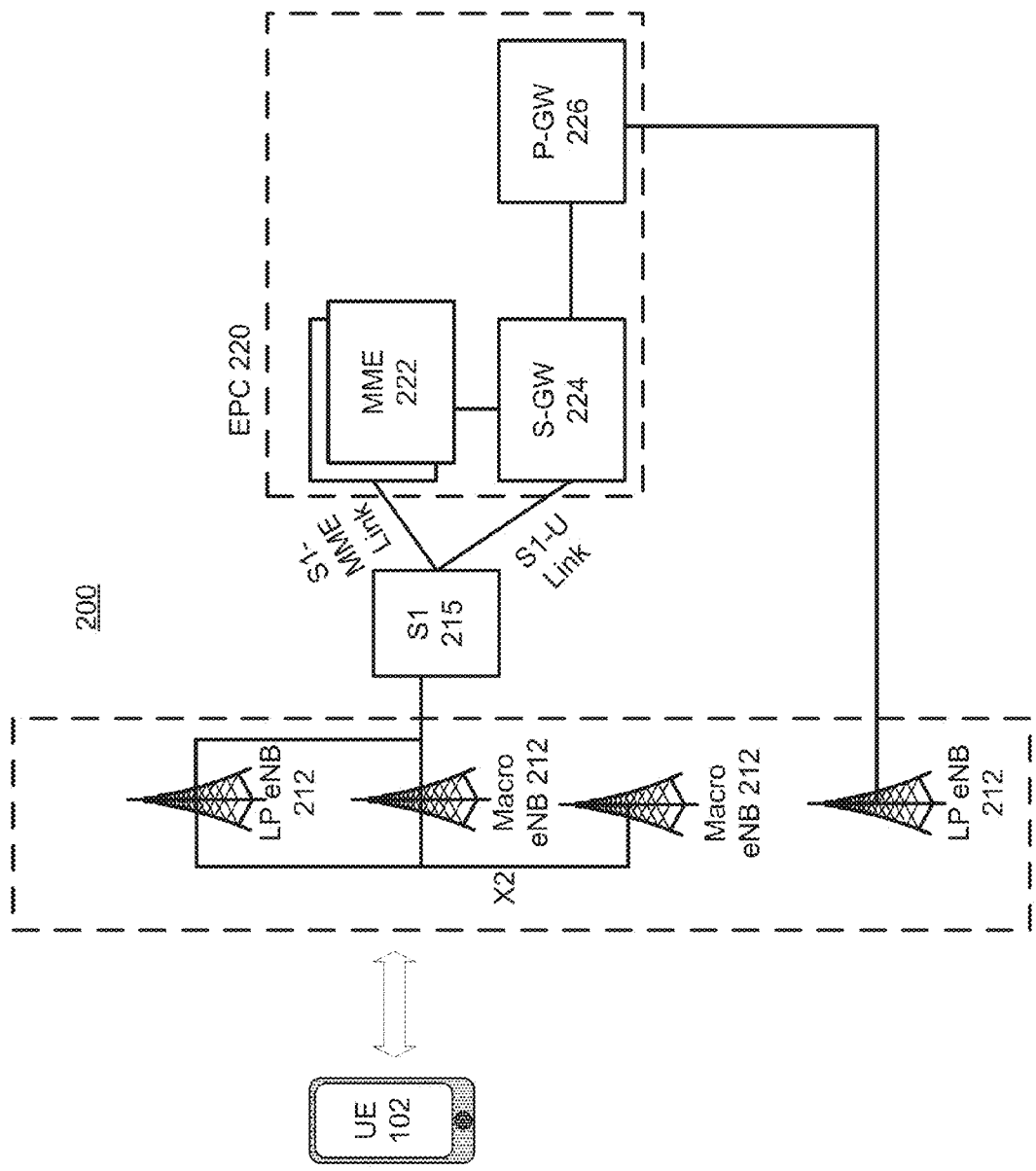
FIG. 2 illustrates an architecture of components of an LTE network, in accordance with some embodiments.

FIG. 2 illustrates an architecture of components of an LTE network, in accordance with some embodiments. In this example, (sub)system 200 comprises an Evolved Packet System (EPS) on an LTE network, and thus includes an E-UTRAN 210 and an EPC network 220 communicatively coupled via an S1 interface 215. In this illustration, only a portion of the components of E-UTRAN 210 and the EPC network 220 are shown. Some of the elements described below may be referred to as "modules" or "logic." As referred to herein, "modules" or "logic" may describe hardware (such as a circuit), software (such as a program driver) or a combination thereof (such as a programmed microprocessing unit).

The E-UTRAN 210 includes eNodeBs 212 (which can operate as base stations) for communicating with one or more UEs (e.g., the UE 102). The eNodeBs 212 are shown in this example to include macro eNodeBs and low power (LP) eNodeBs. Any of the eNodeBs 212 can terminate the air interface protocol and can be the first point of contact for the UE 102. In some embodiments, any of the eNodeBs 212 can fulfill various logical functions for the E-UTRAN 210 including but not limited to radio network controller (RNC) functions such as radio bearer management, uplink and downlink dynamic radio resource management and data packet scheduling, and mobility management. eNodeBs in EPS/LTE networks, such as the eNodeBs 212, do not utilize a separate controller (i.e., an RNC) to communicate with the EPC network 220; in other embodiments utilizing other specification protocols, RANs can include an RNC to enable communication between BSs and core networks.

In accordance with embodiments, the UE 102 can be configured to communicate Orthogonal Frequency-Division Multiplexing (OFDM) communication signals with any of the eNodeBs 212 over a multicarrier communication channel in accordance with an Orthogonal Frequency-Division Multiple Access (OFDMA) communication technique for downlink communications, and a Single Carrier Frequency Division Multiple Access (SC-FDMA) communication technique for uplink communications. The OFDM signals can comprise a plurality of orthogonal subcarriers.

In accordance with some embodiments, the UE 102 can be configured to determine a synchronization reference time based on reception of one or more signals from any of the eNodeBs 212. The UE 102 can also be configured to support device-to-device (D2D) communication with other UEs using OFDMA, SC-FDMA, or other multiple access schemes.

The S1 interface 215 is the interface that separates the E-UTRAN 210 and the EPC network 220. It is split into two parts: the S1-U, which carries traffic data between the eNodeBs 212 and the serving gateway (S-GW) 224, and the S1-MME, which is a signaling interface between the eNodeBs 212 and the mobility management entities (MMEs) 222. An X2 interface is the interface between eNodeBs 212. The X2 interface can comprise two parts (not shown): the X2-C and X2-U. The X2-C is the control plane interface between the eNodeBs 212, while the X2-U is the user plane interface between the eNodeBs 212.

With cellular networks, low power cells can be used to extend coverage to indoor areas where outdoor signals do not reach well, or to add network capacity in areas with very dense phone usage, such as train stations. As used herein, the term "LP eNodeB" refers to any suitable relatively low power eNodeB for implementing a narrower cell (i.e., narrower than a macro cell) such as a femtocell, a picocell, or a micro cell at the edge of the network. Femtocell eNodeBs are typically provided by a mobile network operator to its residential or enterprise customers. A femtocell is typically the size of a residential gateway or smaller, and generally connects to the user's broadband line. Once plugged in, the femtocell connects to the mobile operator's mobile network and provides extra coverage in a range of typically 30 to 50 meters for residential femtocells. Thus, an LP eNodeB might be a femtocell eNodeB since it is coupled through the packet data network gateway (PGW) 226. Similarly, a picocell is a wireless communication system typically covering a small area, such as in-building (offices, shopping malls, train stations, etc.) or, more recently, in-aircraft. A picocell eNodeB can generally connect through the X2 link to another eNodeB such as a macro eNodeB through its base station controller (BSC) functionality. Thus, an LP eNodeB can be implemented with a picocell eNodeB since it is coupled to a macro eNodeB via an X2 interface. Picocell eNodeBs or other LP eNodeBs can incorporate some or all functionality of a macro eNodeB. In some cases, this can be referred to as an AP BS or enterprise femtocell.

In some embodiments, a downlink resource grid can be used for downlink transmissions from any of the eNodeBs 212 to the UE 102, while uplink transmission from the UE 102 to any of the eNodeBs 212 can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this represents the smallest quantity of resources that currently can be allocated. There are several different physical downlink channels that are conveyed using such resource blocks.

The physical downlink shared channel (PDSCH) carries user data and higher-layer signaling to the UE 102. The physical downlink control channel (PDCCH) carries information about the transport format and resource allocations related to the PDSCH channel, among other things. It also informs the UE 102 about the transport format, resource allocation, and H-ARQ (Hybrid Automatic Repeat Request) information related to the uplink shared channel. Typically, downlink scheduling (assigning control and shared channel resource blocks to the UE 102 within a cell) is performed at any of the eNodeBs 212 based on channel quality information fed back from the UE 102 to any of the eNodeBs 212, and then the downlink resource assignment information is sent to the UE 102 on the control channel (PDCCH) used for (assigned to) the UE.

The PDCCH uses control channel elements (CCEs) to convey the control information. Before being mapped to resource elements, the PDCCH complex-valued symbols are first organized into quadruplets, which are then permuted using a sub-block inter-leaver for rate matching. Each PDCCH is transmitted using one or more of these CCEs, where each CCE corresponds to nine sets of four physical resource elements known as resource element groups (REGs). Four Quadrature Phase Shift Keying (QPSK) symbols are mapped to each REG. The PDCCH can be transmitted using one or more CCEs, depending on the size of the downlink control information (DCI) and the channel condition. There can be four or more different PDCCH formats defined in LTE with different numbers of CCEs (e.g., aggregation level, L=1, 2, 4, or 8).

The EPC network 220 includes the MMEs 222, the S-GW 224, and a PGW 226. The MMEs 222 are similar in function to the control plane of legacy Serving General packet radio service (GPRS) Support Nodes (SGSN). The MMEs 222 manage mobility aspects in access such as gateway selection and tracking area list management. The S-GW 224 terminates the interface toward the E-UTRAN 210, and routes data packets between the E-UTRAN 210 and the EPC network 220. In addition, it can be a local mobility anchor point for inter-eNodeB handovers and also can provide an anchor for inter-3GPP mobility. Other responsibilities can include lawful intercept, charging, and some policy enforcement.

The S-GW 224 and the MMEs 222 can be implemented in one physical node or separate physical nodes. The PGW 226 terminates an SGi interface toward the packet data network (PDN). The PGW 226 routes data packets between the EPC network 220 and external networks (e.g., the internet), and can be a key node for policy enforcement and charging data collection. The PGW 226 and S-GW 224 can be implemented in one physical node or separated physical nodes.

The UE 102 performs cell selection upon power-up and cell reselections throughout its operation. The UE 102 searches for a cell provided by E-UTRAN 210 (e.g., a macro cell or a picocell). During the cell reselection process, the UE 102 can measure reference signal strength for each neighboring cell (e.g., Reference Signal Received Power/ Reference Signal Received Quality (RSRP/RSRQ)) and select a cell based on this measurement (e.g., select a cell with the highest RSRP value). After the UE 102 selects a cell, it can verify the accessibility of the cell by reading the master information block (MIB). If the UE 102 fails to read the MIB of the selected cell, it can discard the selected cell and repeat the above process until a suitable cell is discovered.

A radio resource control (RRC) state indicates whether an RRC layer of the UE 102 is logically connected to an RRC layer of the E-UTRAN 210. After the UE 102 is communicatively coupled to a cell, its RRC state is RRC_IDLE. When the UE 102 has data packets to transmit or receive, its RRC state becomes RRC_CONNECTED.

Short-lived UE connections are a potential source of increasing network traffic for cellular systems such as an LTE network utilizing the (sub)system 200. Technologies such as machine-to-machine (M2M) or machine-type communications (MTC) for (machine initiated) exchanging data with an MTC server and/or device via a public land mobile network (PLMN), device-to-device (D2D), sensor networks or Internet of Things (IoT) (which describes interconnecting uniquely identifiable embedded computing devices within the internet infrastructure) have short-lived connections, in addition to background applications (e.g., (e.g., keep-alive messages, status updates, etc.) executed by the UE 102. Utilizing traditional (i.e., legacy) connectivity procedures for short-lived UE connections would significantly increase the signaling overheard that exists in LTE networks. Furthermore, utilizing traditional connectivity procedures may prevent operators/service providers from differentiating lightweight traffic from normal traffic. Furthermore, traditional connectivity procedures are not scalable.

Figure 3:
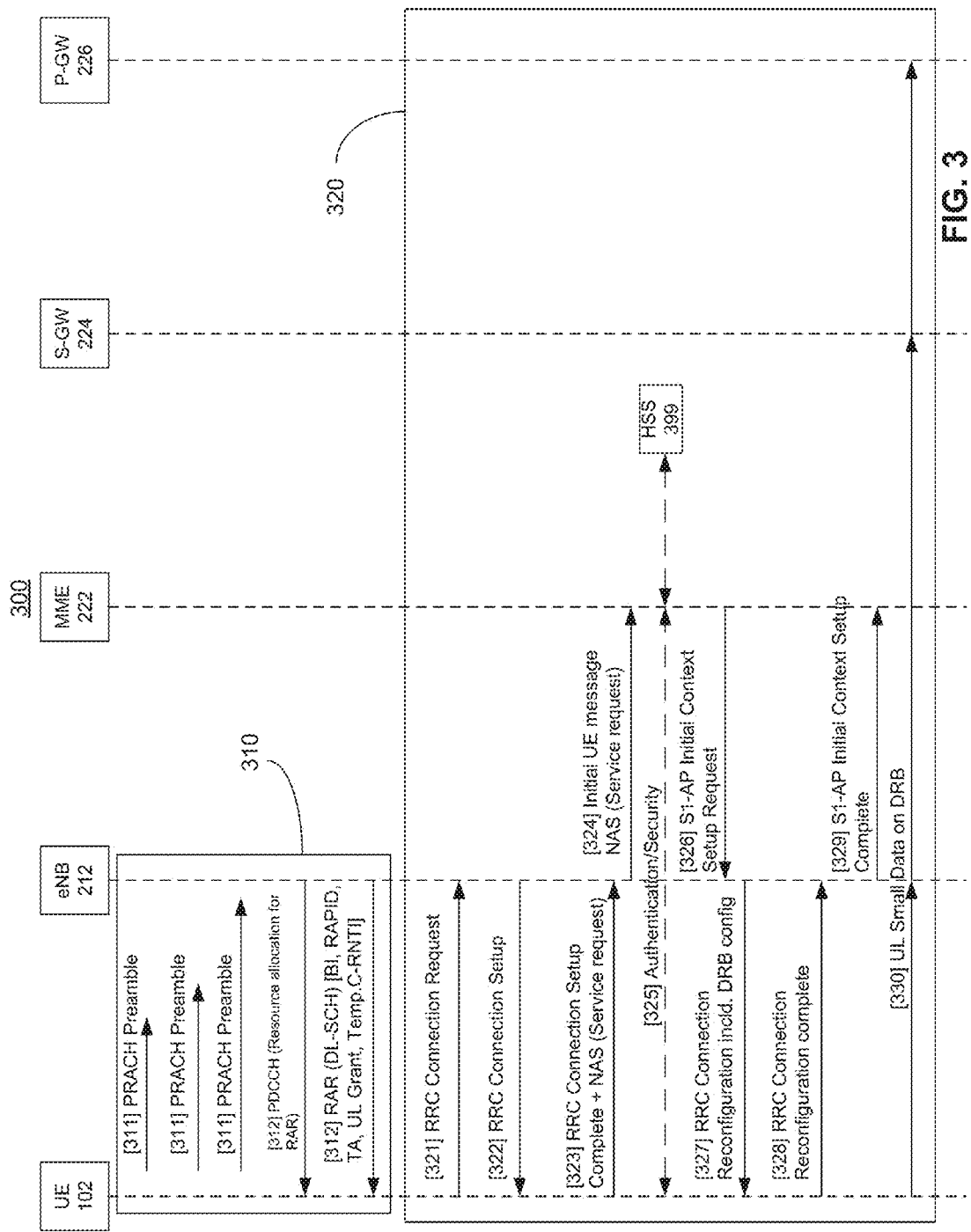
FIG. 3 is an illustration of a process for utilizing legacy-compatible connectivity procedures for short-lived connections in accordance with some embodiments.

FIG. 3 is an illustration of a process for utilizing legacy-compatible connectivity procedures short-lived connections in accordance with some embodiments. Process and logical flow diagrams as illustrated herein provide examples of sequences of various process actions. Although shown in a particular sequence or order, unless otherwise specified, the order of the actions can be modified. Thus, the described and illustrated implementations should be understood only as examples, and the illustrated processes can be performed in a different order, and some actions can be performed in parallel. Additionally, one or more actions can be omitted in various embodiments; thus, not all actions are executed in every implementation. Other process flows are possible.

In this example, a legacy messaging process 300 is illustrated for establishing a connection for components of the (sub)system 200 of FIG. 2. A messaging sequence 310 comprises a random access procedure for the UE 102 and the eNodeB 212. For the message 311, the UE 102 selects an available physical random access channel (PRACH) preamble. The UE 102 also gives its own identity to the network (i.e., the E-UTRAN 210 and the EPC network 220) so that network can address it in subsequent messages; this identity may be referred to as the random access radio network temporary identity (RA-RNTI) of the UE 102. If the UE 102 does not initially receive any response from the network, it increases its power and subsequently re-sends the PRACH preamble message 311 until a response is received.

The eNodeB 212 sends a Random Access Response (RAR) message 312 to the UE 102 addressed to the RA-RNTI (and also sends PDCCH resource allocation for the RAR message 312). The RAR message 312 may include a MAC header including a backoff indicator (BI) subheader, a Random Access Preamble Identifier (RAPID) field, and a MAC payload including a timing advance (TA) field, an uplink (UL) grand field, and a temporary cell radio network temporary identity (C-RNTI) field indicating the temporary identity for the UE 102 to use during random access.

A messaging sequence 320 is shown to include several messages exchanged between network components for establishing an RRC Connection. The UE 102 sends an RRC connection request message 321 to the eNodeB 212. The eNodeB 212 sends an RRC Connection Setup message 322 to the UE 102; this message 322 includes configuration information for a signal radio bearer (SRB). The UE 102 sends an RRC Connection Setup Complete message 323, which includes a non-access stratum (NAS) service request, to the eNodeB 212. The eNodeB 212 forwards the service request message (shown as a message 324) to a network control entity—in this example, the MME 222. In some embodiments, if rejection of the connection request is taken care of by another message, UL grant can simply be sent in PDCCH and message 324 is not sent.

An authentication security routine 325 is shown to be executed to establish security context information, including an S1 tunnel identification. The routine 325 is shown to include the MME 222 accessing a Home Subscriber Server (HSS) 399, which includes subscription-related information (e.g., subscriber profiles), performs authentication and authorization of the user, and can provide information about the location and IP information of the UE 102.

The MME 222 sends an initial context setup request message 326 to the eNodeB 212. The message 326 includes information from the authentication security routine 325. The eNodeB 212 sends an RRC Connection Reconfiguration message 327, which includes configuration information for one or more data radio bearers (DRBs), to the UE 102. The UE 102 sends an RRC Connection Reconfiguration Complete message 328 to the eNodeB 212 to establish one or more DRBs. The eNodeB 212 sends an Initial Context Setup Response message 329 to the MME 222, which includes information such as the address of the eNodeB 212 and S1 tunnel identification for the downlink of the S1 tunnel.

Thus, FIG. 3 illustrates that messages 311-330 are exchanged between different nodes of an LTE network to establish a DRB even if the DRB is only to be used for small data transmission. Tables 1 and 2 below further illustrate the signaling overhead (in bytes) and the number of messages exchanged over the S1-MME interface for the messaging process 300.

TABLE 1

Signaling overhead bytes for legacy LTE case

| Direction | Messages | Bytes (DL) | Bytes (UL) |
|---|---|---|---|
| UL | Preamble | | X |
| DL | Random Access Response | 7 | |
| UL | RRC Connection Request | | 7 |
| DL | RRC Connection Setup | 38 | |
| UL | RRC Connection Setup Complete (NAS Service Request) + BSR | | 22 |
| DL | Security Mode Command + RLC Status Report | 14 | |
| UL | Security Mode Complete + BSR | | 12 |
| DL | RRC Connection Reconfiguration (SRB2 & DRB configuration) + RLC Status Report | 61 | |
| UL | RRC Connection Reconfiguration Complete + BSR | | 12 |
| UL | Data Packet + RLC Status Report | | 3 |

TABLE 1-continued

Signaling overhead bytes for legacy LTE case

| Direction | Messages | Bytes (DL) | Bytes (UL) |
|---|---|---|---|
| DL | Data Packet + RLC Status Report | 3 | |
| DL | RRC Connection Release + RLC Status Report | 13 | |
| UL | RLC Status Report | | 3 |
| | Total signalling (Bytes) | 136 | 59 |

TABLE 2

Messages exchanged over the S1-MME interface

| Direction | Message |
|---|---|
| eNB -> MME | Initial UE message |
| eNB <- MME | Initial Context Setup Request |
| eNB -> MME | Initial Context Setup Response |
| eNB -> MME | UE Context Release Request |
| eNB <- MME | UE Context Release Command |
| eNB -> MME | UE Context Release Complete |
| | Total number of messages |
| eNB -> MME | 4 |
| eNB <- MME | 2 |

Figure 4:
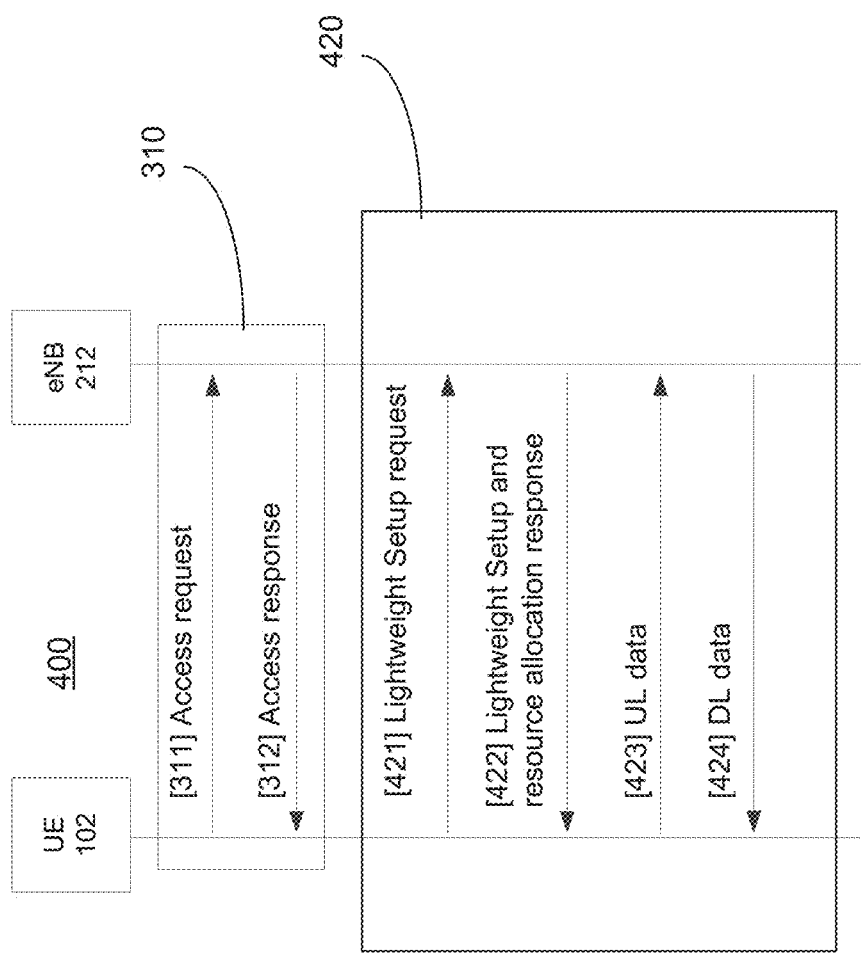
FIG. 4 is an illustration of a lightweight communication protocol process for establishing short-lived connections in accordance with some embodiments.

FIG. 4 is an illustration of a lightweight communication protocol process for establishing short-lived connections in accordance with some embodiments. In this example, messaging process 400 is illustrated as a lightweight communication protocol process for components of the (sub)system 200 of FIG. 2. Lightweight communication protocols may be alternatively referred to herein as "pre-configured communication protocols" or "reduced signaling communication protocols."

The messaging sequence 310 of FIG. 3 comprising a random access procedure for the UE 102 and the eNodeB 212 is used; however, in this example the RRC connection messaging sequence 320 of FIG. 3 is replaced with a messaging sequence 420 comprising a reduced number of messages exchanged between different nodes of an LTE network to establish a DRB for a lightweight connection request/response.

In this example, the messaging sequence 420 includes a lightweight setup request message 421 sent from the UE 102 to the eNodeB 212, and a lightweight setup and resource allocation response message 422 sent from the eNodeB 212 to the UE 102 (if the short-lived connection can be successfully established); subsequently, the UE 102 and the eNodeB 212 can exchange uplink data 423 and downlink data 424 utilizing DRBs established for the short-lived connection.

In some embodiments, a confirmation response to the lightweight setup request message 421 may be conveyed using a downlink message to indicate any bearer configuration parameter that could have changed and optionally include contention resolution ID MAC Control Element (CE). The size of the resource allocation response message 422 (using the byte calculation example above) is 14 bytes; these bytes account for 2 bytes of MAC header, 6 bytes of the RRC message (which may include the EPS bearer ID within MAC-mainConfig), and 6 bytes of the UE contention Resolution ID MAC CE.

In other embodiments, additional information elements (IEs) could be considered by using a flag to indicate whether the connection requested via the lightweight setup request message 421 can be established or not. This flag can be used, for example, in an RRC-type message or a new message type specifically for lightweight connection request/response messages. Any type of message flag may be used for the eNodeB to indicate that the UE needs to request connection utilizing traditional legacy (i.e., non-lightweight) procedures. In some of these embodiments, this type of IE may be used only when lightweight communication protocols cannot be utilized.

For example, lightweight communication protocols may not be used if a UE switched eNodeBs/cells while in an idle state. If the UE transmits a lightweight setup request message (as it is unaware that it has switched eNodeBs/cells), the eNodeB receiving the lightweight setup request message may indicate via a message flag that legacy connectivity procedures are to be used. In other words, if for any reason the requested connection cannot be established using the messaging sequence 420 and the legacy messaging sequence 320 of FIG. 3 is to be used instead, this may be conveyed by the eNodeB utilizing any type of IE, such as a message flag. Furthermore, in some embodiments the network might indicate through the message 422 (or, in other embodiments, via the pre-existing RRCConnectionReject message) when the UE 102 is not allowed to use the lightweight protocol. The reason for the inability to use lightweight communication protocols can be signaled by an IE. Alternatively, different response messages could be used to indicate the reason; for example, the network rejects the access due to congestion (and the message includes a wait-time parameter for the connection to be re-attempted), the network rejects the access because the UE 102 is not authorized to use this lightweight mechanism, the network requests the re-configuration or re-admission of the lightweight communication protocol related parameters, etc. Furthermore, these different response messages could differentiate between the low level parameters that need to be re-configured or if security needs to be checked.

Thus, the quantity of messages in the messaging sequence 420 is greatly reduced compared to the messaging sequence 320 of FIG. 3. Short-lived connections may typically comprise a same or similar communication type with data use within a known range, and thus UE-specific information can be saved and re-used for subsequent short-lived connections. Furthermore, a device may transmit/receive the same type and/or amount of data in different short-lived connection communication sessions. As discussed in further detail below, the quantity and data size of messages for establishing connections via lightweight communication protocols may be reduced according to these expected attributes.

In some embodiments, a radio bearer specific to a lightweight connection request may be utilized by network components. For example, a DRB for a short-lived connection used for IoT/MTC type of data may be pre-configured to utilize a specific logical channel identity, poll data unit (PDU), pollByte parameter (for Radio Link Control Acknowledge Mode (RLC AM)), prioritized bit rate, and logical channel group settings. An example of these DRB parameters are listed below:

Parameters

| Name | Value | Semantics description | Ver |
|---|---|---|---|
| RLC configuration logicalChannelIdentity | 3 | | |

Parameters

| Name | Value | Semantics description | Ver |
|---|---|---|---|
| RLC configuration CHOICE | am | | |
| ul-RLC-Config | | | |
| >t-PollRetransmit | ms45 | | |
| >pollPDU | p4 | | |
| >pollByte | KB1500 | | |
| >maxRetxThreshold | t4 | | |
| dl-RLC-Config | | | |
| >t-Reordering | ms35 | | |
| >t-StatusProhibit | ms0 | | |
| Logical channel configuration | | | |
| Priority | 3 | | |
| prioritisedBitRate | kBps2048-v1020 | | |
| bucketSizeDuration | N/A | | |
| logicalChannelGroup | 1 | | |

In some embodiments, instead of one specific configuration, different sets of radio bearer configuration information could be defined and could be used dynamically by the network and UE based on certain rules such as UE category. In some embodiments, the network may signal to a UE which set of radio configurations to use based on dedicated signaling during initial access or through broadcast information. Thus, in some embodiments, a pre-existing (e.g., Default DRB) radio bearer may be set up at the UE 102 during an initial access procedure. Some information specific to the UE 102 may be used for DRBs assigned to the UE 102 upon reconnection to an LTE network. This UE-specific information can also be used to reduce messaging overhead in establishing the short-lived connection.

Figure 5:
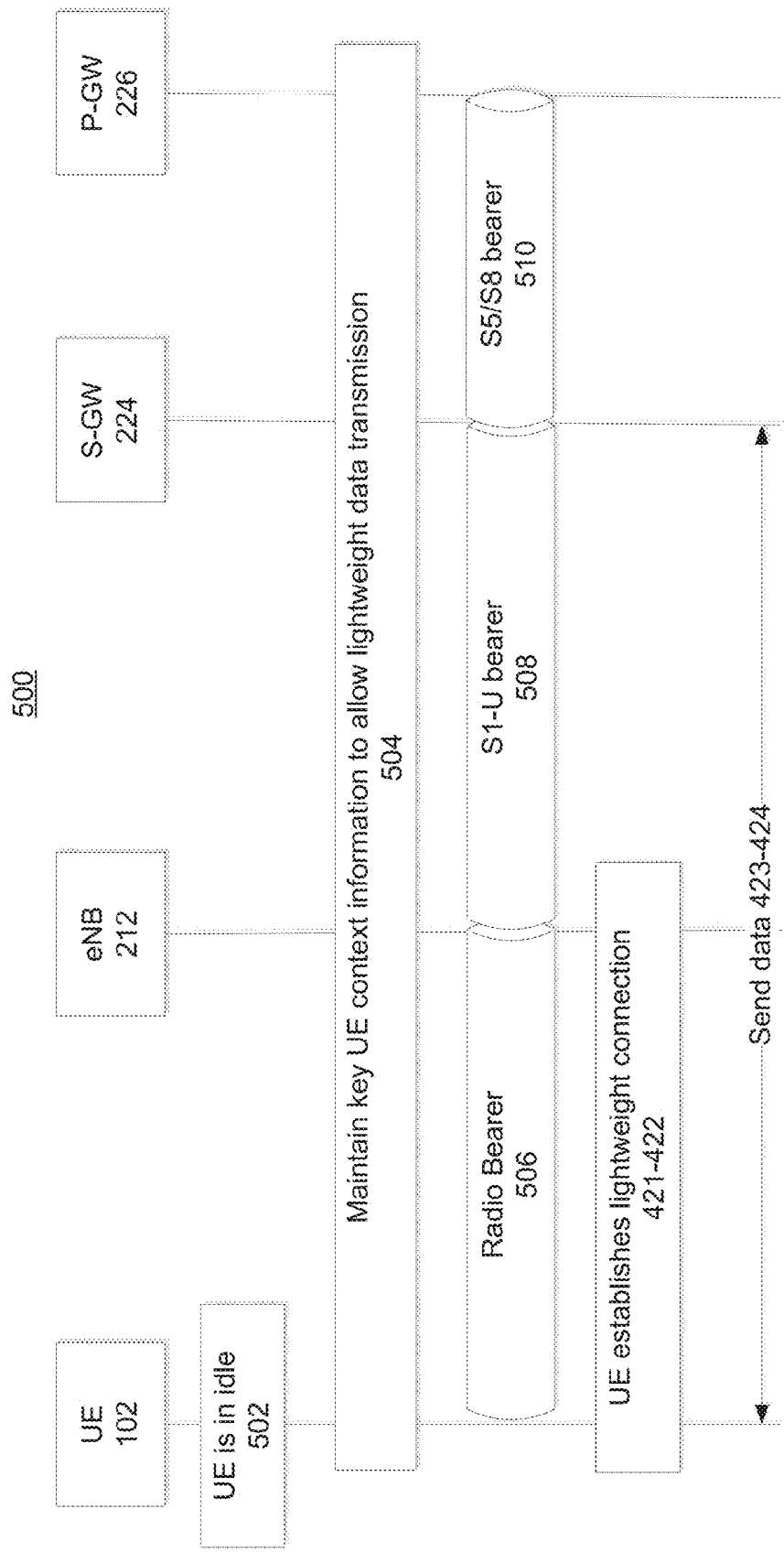
FIG. 5 is an illustration of a lightweight communication protocol process for establishing short-lived connections using user equipment-specific information in accordance with some embodiments.

FIG. 5 is an illustration of a process for establishing short-lived connections via lightweight communication protocols using UE-specific information in accordance with some embodiments. In this example, process 500 illustrates operations performed by various network nodes to store UE-specific context information. The UE 102 executes an operation 502 to transition from an active state to an idle state. While the UE 102 is idle, operation 504 is executed across various network nodes to store UE context information.

For example, the eNodeB 212 can store UE context information such as UE ID, Transaction ID, UE state information, E-UTRAN Radio Access Bearer ID (E-RAB ID— i.e., the EPS Bearer ID) if the UE is assigned multiple bearers, UE-associated logical S1 connection information (e.g., S-GW Tunnel Endpoint Identifier (TEID), S-GW IP address), security information, etc. The S-GW 224 can also store UE context information such as UE ID, E-RAB ID, UE-associated logical S1 connection information (e.g., S-GW TEID, S-GW IP address), eNodeB TEID for the S1-U bearer 508, eNodeB IP address for the S1-U bearer 508, security information, information for the S5/S8 bearer 510 (the S5/S8 interface is an interface (i.e., user plane) between the S-GW 224 and the P-GW 226), MME ID information, etc. The P-GW 226 may also store relevant UE context information, or instead rely on context information stored at the S-GW 224.

The UE 102 may also store its own context information such as its security context, radio parameter information, bearer information, bearer IDs, connection IDs, etc. Thus, the UE context information saved across various network nodes allows for the radio bearer 506, and the S1-U bearer 508, to be used when the UE 102 transitions from idle mode (the S5/S8 bearer 510 is already retained), thereby allowing for a reduced number of radio connections to be exchanged between the UE 102 and the eNodeB 212 (i.e., the messages 421, 422) to enable short-lived connection data uplink/downlink data 423, 424 to be exchanged.

In some embodiments, the above described UE-specific context information may be stored at the various network nodes for a pre-defined period of time. In embodiments where the UE-specific context is maintained in a lightweight fashion, it may be shared across multiple cells within an area to seamlessly aid in low mobility scenarios.

As discussed above with reference to FIG. 4, the request message 421 sent from the UE 102 to the eNodeB 212 can indicate a request to send/receive data via lightweight mechanism. In some embodiments, this request message may comprise a modified RRCConnectionRequest message. FIG. 6A is an illustration of potential modifications to an RRCConnectionRequest message for indicating a lightweight connection request in accordance with some embodiments. In this example, possible modifications for a message data structure 600 for an RRCConnectionRequest message are shown as modifications 610-630 for indicating that the UE 102 requesting a short-lived connection (and for the eNodeB may prepare the resource allocation for the UE accordingly).

The modification 610 is shown to utilize the spare2 or spare1 establishment cause to indicate an intention to establish a short-lived connection via a lightweight connection request (i.e., a pre-configured connection or a reduced signaling connection). In this example, one or more of the spare bits may be used to specify "lightweightAcccess" to indicate to the eNodeB that the UE 102 requests to use the lightweight connection request for establishing a short-lived data transfer. In some embodiments, the UE 102 may know in advance that the eNodeB supports this method of communication.

As shown in FIG. 6A, the RRCConnectionRequest message is a short message with a few parameters. For the modification 620, a spare IE bit (i.e., bit string of length one) is utilized for indicating that the UE 102 is intending to use the lightweight connection request. For example, the bit may be indicated as "connectionType" or "lightweightConnection" with 0 or 1 indicating lightweight connection request or regular (i.e., legacy) connection request (other similar notations may be used).

The modification 630 as illustrated comprises extending the RRCConnectionRequest message using the criticalExtensionsFuture field; eNodeBs supporting lightweight communication protocols may check or expect this information. An example of a criticalExtensionsFuture field may be:

```
criticalExtensions                CHOICE {
    c1                            CHOICE {
        connectionType-r13        BIT STRING (SIZE (1)),
        spare3 NULL, spare2 NULL, spare1 NULL
    },
    criticalExtensionsFuture      SEQUENCE { }
}
``` wherein connectionType-r13 is shown to be of type BIT STRING of size 1 (in other embodiments, this can also be of different size or different type such as ENUMERATED). The selectedPLMN-Identity and/or RegisteredMME may also be included in an RRCConnectionRequest message by using criticalExtensions to potentially remove sending NAS Service Request+BSR lightweight communication by the UEs:

```
RegisteredMME ::=       SEQUENCE {
    plmn-Identity       PLMN-Identity
    OPTIONAL,
    mmegi               BIT STRING (SIZE (16)),
    mmec                MMEC
}
```

In other embodiments, a new message class may be used to decouple the lightweight connection request message from the original RRCConnectionRequest message. This would be a new message specifically for devices that intend to use a lightweight mechanism, and therefore reduce signaling overhead. FIG. 6B is an illustration of a message data structure 650 specifically for devices that intend to utilize a lightweight connection request in accordance with some embodiments. In this example, a message data structure 650 is shown to comprise uplink common control channel (UL-CCCH) message including various data elements specifically for use in lightweight connection requests. The capability of an eNodeB to support lightweight mechanisms may be broadcast as part of an existing or new system information broadcast (SIB) message. The UE identity and Establishment Cause may be re-utilized from the RRCConnectionRequest message. The UL-CCCH-Message class is the set of RRC messages that may be sent from the UE to the E-UTRAN on the uplink CCCH logical channel.

Figure 7:
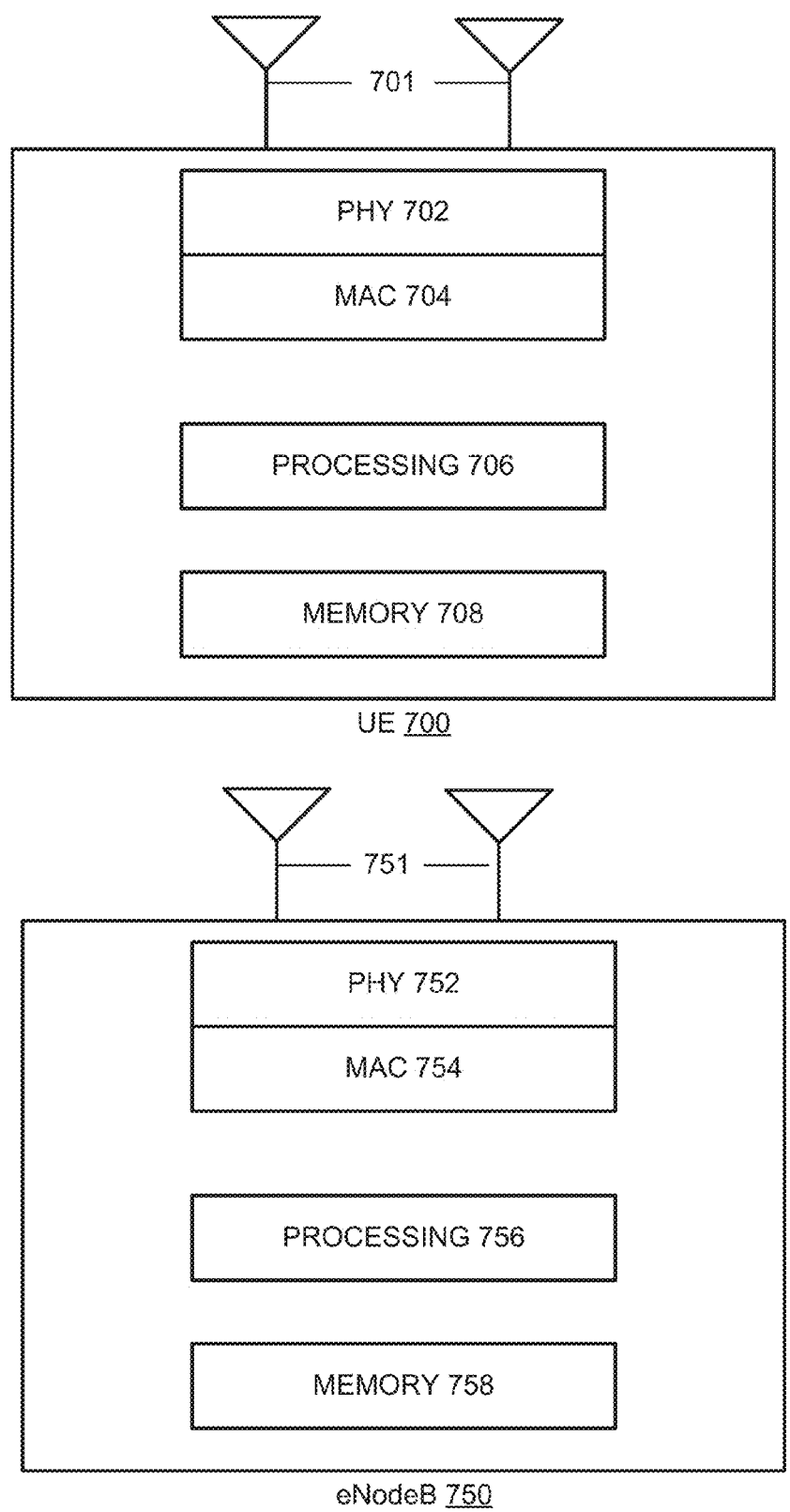
FIG. 7 shows a block diagram of a user equipment and an eNodeB in accordance with some embodiments.

FIG. 7 shows a block diagram of a UE 700 and an eNodeB 750, in accordance with some embodiments. It should be noted that in some embodiments, the eNodeB 750 can be a stationary non-mobile device. The UE 700 can include physical layer circuitry 702 for transmitting and receiving signals to and from the eNodeB 750, other eNodeBs, other UEs, or other devices using one or more antennas 701, while the eNodeB 750 can include physical layer circuitry 752 for transmitting and receiving signals to and from the UE 700, other eNodeBs, other UEs, or other devices using one or more antennas 751. The UE 700 can also include medium access control layer (MAC) circuitry 704 for controlling access to the wireless medium, while the eNodeB 750 can also include MAC circuitry 754 for controlling access to the wireless medium. The UE 700 can also include processing circuitry 706 and memory 708 arranged to perform the operations described herein, and the eNodeB 750 can also include processing circuitry 756 and memory 758 arranged to perform the operations described herein.

The antennas 701, 751 can comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas 701, 751 can be effectively separated to benefit from spatial diversity and the different channel characteristics that can result.

Although the UE 700 and eNodeB 750 are each illustrated as having several separate functional elements, one or more of the functional elements can be combined and can be implemented by combinations of software-configured elements, such as processing elements including digital signal processors (DSPs), and/or other hardware elements. For example, some elements can comprise one or more microprocessors, DSPs, field-programmable gate arrays (FPGAs), application specific integrated circuits (ASICs), radio-frequency integrated circuits (RFICs), and combinations of various hardware and circuitry for performing at least the functions described herein. In some embodiments, the functional elements can refer to one or more processes operating on one or more processing elements.

Embodiments can be implemented in one or a combination of hardware, firmware, and software. Embodiments can also be implemented as instructions stored on a computer-readable storage device, which can be read and executed by at least one processor to perform the operations described herein. A computer-readable storage device can include any non-transitory mechanism for storing information in a form readable by a machine (e.g., a computer). For example, a computer-readable storage device can include read-only memory (ROM), random-access memory (RAM), magnetic disk storage media, optical storage media, flash-memory devices, and other storage devices and media. Some embodiments can include one or more processors and can be configured with instructions stored on a computer-readable storage device.

In accordance with embodiments, the UE 700 can operate in accordance with a D2D communication mode. The UE 700 can include hardware processing circuitry 706 configured to determine a synchronization reference time based on reception of one or more signals from the eNodeB 750. The hardware processing circuitry 706 can be further configured to, during a D2D communication session, transmit Multi-Time Transmission Interval Bundle Groups (MTBG) of data symbols during a first group of data transmission intervals (DTI) and refrain from transmission of data symbols during a second group of DTIs that is exclusive to the first group of DTIs. Starting times of the DTIs can be based at least partly on the synchronization reference time. The hardware processing circuitry 706 can be further configured to transmit, during an in-network communication session exclusive to the D2D communication session, data symbols according to a time transmission interval (TTI) reference time that is synchronized to the synchronization reference time. These embodiments are described in more detail below.

In some scenarios, the UE 700, operating in a cellular communication network, can begin to experience performance degradation for various reasons. As an example, user loading or throughput demands of the network can become high. As another example, the UE 700 can move toward or beyond the edges of coverage cells. While operating in the network, the UE 700 can actually be in communication with other UEs that are physically located in close proximity to the UE 700, although the communication can take place through the network. In addition to, or instead of, communication through the network, it can be beneficial to the UE 700 and the system for the UE 700 to engage in direct or D2D communication with one or more other UEs that can be within range of the UE 700. As an example, in the performance degradation scenarios described above, the D2D communication between the UE 700 and the other UEs can enable the network to off-load some of the network traffic, which can improve overall system performance.

Figure 8:
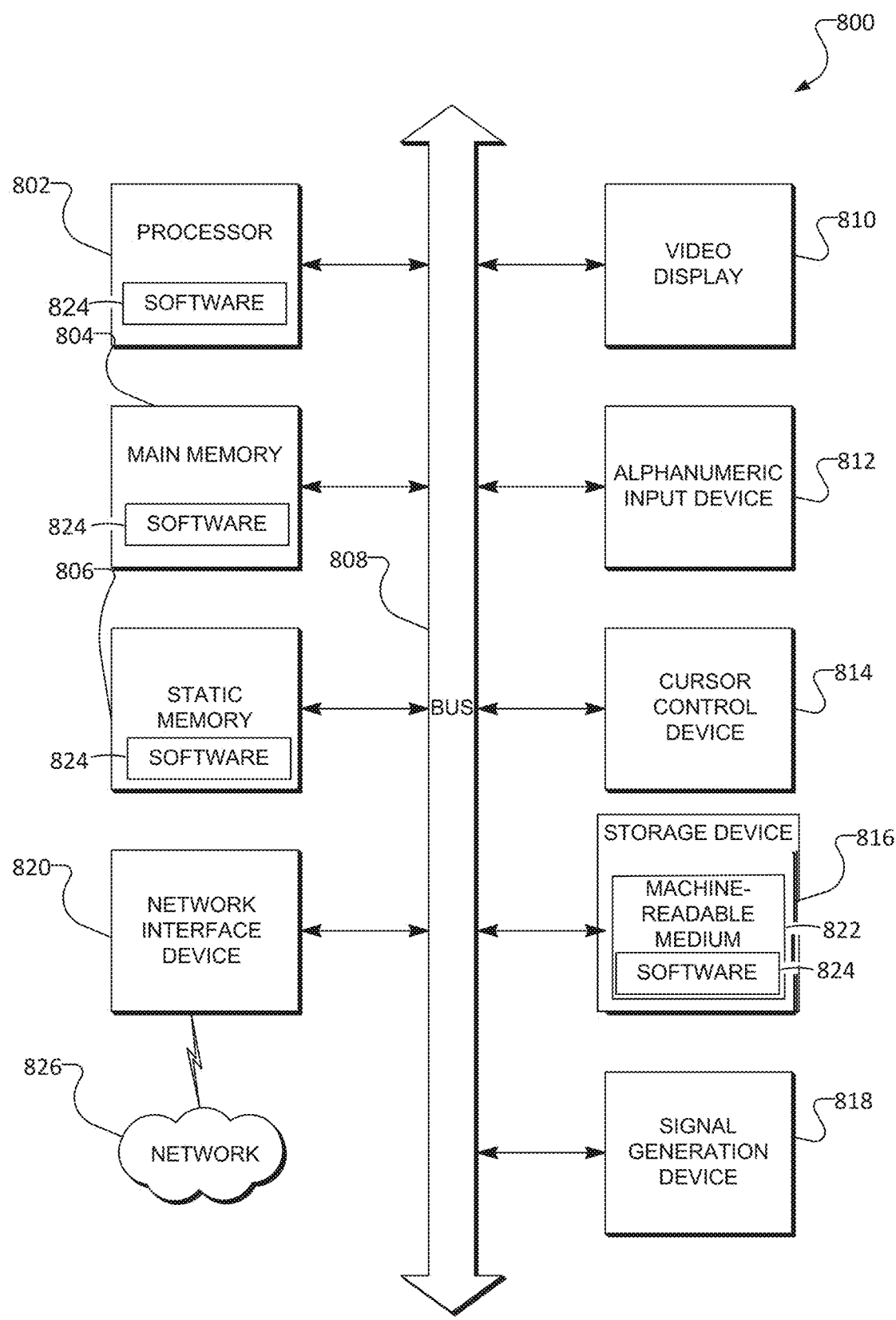
FIG. 8 is a block diagram illustrating components of a machine, according to some example embodiments, able to read instructions from a machine-readable medium and perform any one or more of the methodologies discussed herein, according to aspects of the disclosure.

FIG. 8 is a block diagram illustrating components of a machine, according to some example embodiments, able to read instructions from a machine-readable medium and perform any one or more of the methodologies discussed herein, according to aspects of the disclosure. In particular, FIG. 8 illustrates an exemplary computer system 800 (which can comprise any of the network elements discussed above) within which software 824 for causing the machine to perform any one or more of the methodologies discussed herein can be executed. In alternative embodiments, the machine operates as a standalone device or can be connected (e.g., networked) to other machines. In a networked deployment, the machine can operate in the capacity of a server or a client machine in a server-client network environment, or as a peer machine in a peer-to-peer (or distributed) network environment. The computer system 800 can function as any of the above described UEs or eNodeBs, and can be a personal computer (PC), a tablet PC, a set-top box (STB), a PDA, a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 800 includes a processor 802 (e.g., a central processing unit (CPU), a graphics processing unit (GPU), or both), a main memory 804 and a static memory 806, which communicate with each other via a bus 808. The computer system 800 can further include a video display unit 810 (e.g., a LCD or a cathode ray tube (CRT)). The computer system 800 also includes an alpha-numeric input device 812 (e.g., a keyboard), a user interface navigation (or cursor control) device 814 (e.g., a mouse), a storage device 816, a signal generation device 818 (e.g., a speaker), and a network interface device 820.

The storage device 816 includes a non-transitory machine-readable medium 822 on which is stored one or more sets of data structures and software 824 embodying or utilized by any one or more of the methodologies or functions described herein. The software 824 can also reside, completely or at least partially, within the main memory 804 and/or within the processor 802 during execution thereof by the computer system 800, with the main memory 804 and the processor 802 also constituting non-transitory, machine-readable media 822. The software 824 can also reside, completely or at least partially, within the static memory 806.

While the non-transitory machine-readable medium 822 is shown in an example embodiment to be a single medium, the term "machine-readable medium" can include a single medium or multiple media (e.g., a centralized or distributed database, and/or associated caches and servers) that store the one or more software 824 or data structures. The term "machine-readable medium" shall also be taken to include any tangible medium that is capable of storing, encoding, or carrying instructions for execution by the machine and that cause the machine to perform any one or more of the methodologies of the present embodiments, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media 822 include non-volatile memory, including by way of example semiconductor memory devices (e.g., erasable programmable read-only Memory (EPROM), electrically erasable programmable read-only memory (EEPROM), and flash memory devices); magnetic disks such as internal hard disks and removable disks; magneto-optical disks; and compact disc-read-only memory (CD-ROM) and digital versatile disc (or digital video disc) read-only memory (DVD-ROM) disks.

The software 824 can further be transmitted or received over a communications network 826 using a transmission medium. The software 824 can be transmitted using the network interface device 820 and any one of a number of well-known transfer protocols (e.g., HyperText Transfer Protocol (HTTP)). Examples of communication networks include a local area network (LAN), a wide area network (WAN), the internet, mobile telephone networks, plain old telephone service (POTS) networks, and wireless data networks (e.g., WiFi and WiMax networks). The term "transmission medium" shall be taken to include any intangible medium capable of storing, encoding, or carrying instructions for execution by the machine, and includes digital or analog communications signals or other intangible media to facilitate communication of such software 824.

The drawings and the forgoing description gave examples of the present disclosure. Although depicted as a number of disparate functional items, those skilled in the art will appreciate that one or more of such elements can well be combined into single functional elements. Alternatively, certain elements can be split into multiple functional elements. Elements from one embodiment can be added to another embodiment. For example, orders of processes described herein can be changed and are not limited to the manner described herein. Moreover, the actions of any flow diagram need not be implemented in the order shown; nor do all of the acts necessarily need to be performed. Also, those acts that are not dependent on other acts can be performed in parallel with the other acts. The scope of the present disclosure, however, is by no means limited by these specific examples. Numerous variations, whether explicitly given in the specification or not, such as differences in structure, dimension, and use of material, are possible. The scope of the disclosure is at least as broad as given by the following claims.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

Embodiments describe a user equipment (UE) comprising circuitry configured to transmit a lightweight connection request message to an eNodeB to request a connection, to receive at least one of a response message from the eNodeB indicating a rejection of the lightweight connection request message, or a lightweight connection setup and resource allocation response message from the eNodeB including configuration information for a lightweight connection data radio bearer (DRB), and to exchange uplink/downlink data with the eNodeB via the DRB in response to the reception of the lightweight connection setup and resource allocation response message from the eNodeB.

In some embodiments, the connection comprises at least one of a device-to-device (D2D) or a machine-to-machine (M2M) communication connection. In some embodiments, the M2M communication connection comprises a machine type communication (MTC) connection for exchanging data with an MTC server and/or device via a public land mobile network (PLMN). In some embodiments, the connection comprises an Internet of Things (IOT) connection.

In some embodiments, the lightweight connection request message comprises a modified Radio Resource Control (RRC) Connection Request (RRCConnectionRequest) message. In some embodiments, the RRCConnectionRequest message is modified via an Establishment Clause field to indicate the message comprises a lightweight connection request. In some embodiments, the RRCConnectionRequest message is modified via a spare information element (IE) field to indicate the message comprises a lightweight connection request. In some embodiments, the RRCConnectionRequest message is modified via a criticalExtensionsFuture field to indicate the message comprises a lightweight connection request.

In some embodiments, the lightweight connection request message comprises a message class specific to lightweight connection requests. In some embodiments, the circuitry is further configured to transition from a connected mode to an idle mode, and store one or more of security context information, radio parameter information, and/or bearer information associated with the lightweight connection setup and resource allocation response message received from the eNodeB prior to the transition from the connected mode to the idle mode.

Embodiments describe an eNodeB comprising circuitry configured to receive a lightweight connection request from a user equipment (UE), to forward the lightweight connection request to a network control entity of an Evolved Packet Core (EPC), to receive a message from the network control entity comprising at least one of a message indicating a rejection of the lightweight connection request, or a resource allocation message including configuration information for a lightweight connection data radio bearer (DRB) for use in a lightweight connection, an S1 tunnel identification, and security context information, to generate a lightweight connection response message for the lightweight connection request based on the message received from the network control entity, and to transmit the response message to the UE.

In some embodiments, the configuration information for the lightweight connection DRB comprises configuration information used for any lightweight connection request received by the eNodeB, including one or more of a logical channel identity, a poll data unit (PDU), a pollByte parameter, a prioritized bit rate, and/or logical channel group settings.

In some embodiments, the received lightweight connection request is associated with a transition of a status of the UE from idle to active, and the circuitry is further configured to store UE-specific information in response to the transition of the status of the UE from active to idle, including one or more of a UE identity (ID), a transaction ID, UE state information, an E-UTRAN Radio Access Bearer ID (E-RAB ID), and/or UE-associated logical S1 security information. In some embodiments, the configuration information for the lightweight connection DRB is based, at least in part, on the stored UE-specific information. In some embodiments, the message indicating the rejection of the lightweight connection request includes a request for re-configuration/refresh of the stored UE-specific information utilizing a legacy connection process. In some embodiments, the circuitry is further configured to transmit the stored UE-specific information to a target cell in response to a UE handover to the target cell.

In some embodiments, the message indicating the rejection of the lightweight connection request includes an indication corresponding to a level of network congestion. In some embodiments, the message indicating the rejection of the lightweight connection request includes an indication of non-authorization of the UE for lightweight connections. In some embodiments, the received lightweight connection request comprises a Radio Resource Control (RRC) Connection Request (RRCConnectionRequest) message, and the response message for the lightweight connection request comprises an RRC Connection Reject (RRCConnectionReject) message.

Embodiments describe a method for storing UE information comprising receiving, at an Evolved Packet Core (EPC) node, a notification from an eNodeB of a transition of a status of a user equipment (UE) from connected to idle, and in response to receiving the notification from the eNodeB, storing context information specific to the UE, including one or more of a UE identity (ID), an E-UTRAN Radio Access Bearer ID (E-RAB ID), a serving gateway (S-GW) Tunnel Endpoint Identifier (TEID), an S-GW internet protocol (IP) address, an eNodeB TEID for an S1-U bearer, an eNodeB IP address for the S1-U bearer, information for an S5/S8 bearer associated with a packet gateway (P-GW), and a mobility management entity (MME) ID.

In some embodiments, the EPC node comprises an S-GW, and the method further comprises receiving a notification of a lightweight connection request issued from the UE, generating S1 tunnel identification and security context information based, at least in part, on the stored context information specific to the UE, and transmitting the S1 tunnel identification and security context information to the eNodeB for a connection.

Embodiments describe a non-transitory computer-readable storage medium whose contents, when executed by a computing system, cause the computing system to perform operations, comprising transitioning a user equipment (UE) from a connected mode to an idle mode, and storing at the UE one or more of security context information, radio parameter information, and/or bearer information associated with a lightweight connection setup and resource allocation response message received from an eNodeB prior to the transition from the connected mode to the idle mode. In some embodiments, the operations further comprise transmitting a lightweight connection request message to the eNodeB, the lightweight connection request comprising at least one of a device-to-device (D2D) or a machine-to-machine (M2M) communication connection, receiving at least one of a response message from the eNodeB indicating a rejection of the lightweight connection request, or a lightweight connection setup and resource allocation response message from the eNodeB including configuration information for a lightweight connection data radio bearer (DRB), and exchanging uplink/downlink data with the eNodeB via the DRB in response to the reception of the lightweight connection setup and resource allocation response message from the eNodeB.

The invention claimed is:

1. A user equipment (UE) comprising:
an interface configured to communicate with an eNodeB; and
circuitry configured to:
transition from a connected mode to an idle mode;
configure the interface to transmit a lightweight connection request message to the eNodeB to request a connection after the transition from the connected mode to the idle mode;
configure the interface to receive at least one of: a response message from the eNodeB indicating a rejection of the lightweight connection request message; or a lightweight connection setup and resource allocation response message from the eNodeB including configuration information for a lightweight connection data radio bearer (DRB); and
configure the interface to exchange at least one of uplink or downlink data with the eNodeB via the DRB in response to the reception of the lightweight connection setup and resource allocation response message from the eNodeB;
wherein one or more of security context information, radio parameter information, or bearer information associated with the lightweight connection setup and resource allocation response message received from the eNodeB is stored in the UE prior to the transition from the connected mode to the idle mode.

2. The UE of claim 1, wherein the connection comprises at least one of a device-to-device (D2D) or a machine-to-machine (M2M) communication connection.

3. The UE of claim 2, wherein the M2M communication connection comprises a machine type communication (MTC) connection for exchanging data with at least one of an MTC server or device via a public land mobile network (PLMN).

4. The UE of claim 1, wherein the connection comprises an Internet of Things (IOT) connection.

5. The UE of claim 1, wherein the lightweight connection request message comprises a modified Radio Resource Control (RRC) Connection Request (RRCConnectionRequest) message.

6. The UE of claim 5, wherein the RRCConnectionRequest message is modified via an Establishment Clause field to indicate the message comprises a lightweight connection request.

7. The UE of claim 5, wherein the RRCConnectionRequest message is modified via a spare information element (IE) field to indicate the message comprises a lightweight connection request.

8. The method of claim 5, wherein the RRCConnectionRequest message is modified via a criticalExtensionsFuture field to indicate the message comprises a lightweight connection request.

9. The UE of claim 1, wherein the lightweight connection request message comprises a message class specific to lightweight connection requests.

10. The UE of claim 1, wherein a lightweight connection radio bearer configuration used is based on UE category.

11. An eNodeB comprising:
an interface configured to communicate with a user equipment (UE); and
circuitry configured to:
configure the interface to receive a lightweight connection request from the UE;
configure the interface to forward the lightweight connection request to a network control entity of an Evolved Packet Core (EPC);
configure the interface to receive a message from the network control entity comprising at least one of:
a message indicating a rejection of the lightweight connection request; or
a resource allocation message including configuration information for a lightweight connection data radio bearer (DRB) for use in a lightweight connection, an S1 tunnel identification, and security context information;
generate a lightweight connection response message for the lightweight connection request based on the message received from the network control entity; and
configure the interface to transmit the response message to the UE,
wherein the received lightweight connection request is associated with a transition of a status of the UE from idle to active, and
wherein UE-specific information is stored at the eNodeB after the transition of the status of the UE from active to idle, the UE-specific information including one or more of a UE identity (ID), a transaction ID, UE state information, an E-UTRAN Radio Access Bearer ID (E-RAB ID), or UE-associated logical S1 security information.

12. The eNodeB of claim 11, wherein the configuration information for the lightweight connection DRB comprises configuration information used for any lightweight connection request received by the eNodeB, including one or more of a logical channel identity, a poll data unit (PDU), a pollByte parameter, a prioritized bit rate, or logical channel group settings.

13. The eNodeB of claim 11, wherein the configuration information for the lightweight connection DRB is based, at least in part, on the stored UE-specific information.

14. The eNodeB of claim 11, wherein the message indicating the rejection of the lightweight connection request includes a request for at least one of re-configuration or refresh of the stored UE-specific information utilizing a legacy connection process.

15. The eNodeB of claim 11, wherein the circuitry is further configured to:
configure the interface to transmit the stored UE-specific information to a target cell in response to a UE handover to the target cell.

16. The eNodeB of claim 11, wherein the message indicating the rejection of the lightweight connection request includes an indication corresponding to a level of network congestion.

17. The eNodeB of claim 11, wherein the message indicating the rejection of the lightweight connection request includes an indication of non-authorization of the UE for lightweight connections.

18. The eNodeB of claim 11, wherein the received lightweight connection request comprises a Radio Resource Control (RRC) Connection Request (RRCConnectionRequest) message, and the response message for the lightweight connection request comprises an RRC Connection Reject (RRCConnectionReject) message.

19. The eNodeB of claim 11, wherein the circuitry is further configured to:
share UE-specific context across multiple cells within an area comprising the eNB to use when the UE has a low mobility.

20. The eNodeB of claim 11, wherein the circuitry is further configured to:
reject the lightweight connection request in response to the UE having switched eNodeBs or cells while in an idle state.

21. The eNodeB of claim 11, wherein the lightweight connection response message signals, in an information element, a reason for the inability to use lightweight communication protocols.

22. The eNodeB of claim 11, wherein the circuitry is further configured to:
provide different lightweight connection response messages to indicate to the UE different reasons for an inability to use lightweight communication protocols.

23. The eNodeB of claim 22, wherein the different lightweight connection response messages at least one of:
differentiate between low level parameters to be re-configured or
indicate that security is to be checked.

* * * * *